US012359833B2

(12) United States Patent
Xiong et al.

(10) Patent No.: US 12,359,833 B2
(45) Date of Patent: Jul. 15, 2025

(54) OPTICAL MONITORING DEVICE FOR USE IN HEATING, VENTILATION, AIR CONDITIONING AND REFRIGERATION SYSTEM FOR MOISTURE LEVEL

(71) Applicant: Carrier Corporation, Palm Beach Gardens, FL (US)

(72) Inventors: Ziyou Xiong, Wethersfield, CT (US); Michael Birnkrant, Wethersfield, CT (US); Marcin Piech, East Hampton, CT (US); Richard Lord, Murfreesboro, TN (US); Sarath Chandra Srikakulapu, Dowlaiswaram (IN); Anup Kumar, Mysore (IN); Hari Keerthana Akumalla, Mysore (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 359 days.

(21) Appl. No.: 17/901,395

(22) Filed: Sep. 1, 2022

(65) Prior Publication Data

US 2023/0073702 A1    Mar. 9, 2023

Related U.S. Application Data

(60) Provisional application No. 63/260,877, filed on Sep. 3, 2021.

(51) Int. Cl.
*F24F 11/00* (2018.01)
*F24F 11/63* (2018.01)
(Continued)

(52) U.S. Cl.
CPC ............ *F24F 11/63* (2018.01); *G05B 19/042* (2013.01); *G06T 7/001* (2013.01); *G06V 10/56* (2022.01);
(Continued)

(58) Field of Classification Search
CPC ...................................................... F24F 11/00
See application file for complete search history.

(56) References Cited

U.S. PATENT DOCUMENTS

| 8,064,643 B2 | 11/2011 | Stein et al. |
| 2011/0103643 A1 | 5/2011 | Salsman et al. |
| (Continued) | | |

FOREIGN PATENT DOCUMENTS

| CN | 104969068 A | 10/2015 |
| CN | 108051434 A | 5/2018 |
| (Continued) | | |

OTHER PUBLICATIONS

European Search Report for Application No. 22193505.9; Issued Jan. 30, 2023; 9 Pages.

*Primary Examiner* — Suresh Suryawanshi
(74) *Attorney, Agent, or Firm* — CANTOR COLBURN LLP

(57) ABSTRACT

An optical monitoring device includes a housing including a plurality of walls and an interior space disposed therebetween, an opening disposed in a wall of the plurality of walls, and a movable panel, the opening forms a window through the wall, and the movable panel is configured to be moved to access the interior space; a lamp assembly disposed within the interior space and positioned to project light at the window; a camera including an image receiving lens, the camera positioned within the interior space with the image receiving lens is in optical communication with the window; a memory storage device for storing image data; and a controller in electrical communication with the camera and the memory storage device, wherein the controller is configured to compare instant image data from the camera to image data stored on the memory storage device.

19 Claims, 4 Drawing Sheets

(51) Int. Cl.
  *G05B 19/042* (2006.01)
  *G06T 7/00* (2017.01)
  *G06V 10/56* (2022.01)
  *H04N 7/18* (2006.01)
  *H04N 23/56* (2023.01)
  *F24F 11/32* (2018.01)
  *H04N 7/22* (2006.01)

(52) U.S. Cl.
  CPC ............ *H04N 7/183* (2013.01); *H04N 23/56* (2023.01); *F24F 11/00* (2013.01); *F24F 11/32* (2018.01); *G05B 2219/2614* (2013.01); *G06T 2207/30141* (2013.01); *H04N 7/22* (2013.01)

(56) References Cited

U.S. PATENT DOCUMENTS

2016/0297072 A1* 10/2016 Williams ............ G05D 1/0234
2018/0261060 A1  9/2018 Siminoff et al.
2018/0328853 A1* 11/2018 Ma ........................... F24F 11/30
2019/0068938 A1  2/2019 Asano et al.
2020/0105020 A1  4/2020 Lin et al.
2021/0138754 A1* 5/2021 Cuennet ................ B65H 29/16
2022/0101507 A1* 3/2022 Tournier .............. G06Q 50/163

FOREIGN PATENT DOCUMENTS

| | | | | |
|---|---|---|---|---|
| DE | 102004062812 A1 * | 7/2006 | ............... | B26D 7/32 |
| JP | 2007172536 A | 7/2007 | | |
| JP | 2018162999 A | 10/2018 | | |
| KR | 101237374 B1 | 2/2013 | | |
| KR | 101744409 B1 | 6/2017 | | |
| KR | 102019089 B1 | 9/2019 | | |
| KR | 20190113262 A | 10/2019 | | |
| WO | 2016079888 A1 | 5/2016 | | |
| WO | 2016079894 A1 | 5/2016 | | |
| WO | 2019113812 A1 | 6/2019 | | |

* cited by examiner

OPTICAL MONITORING DEVICE FOR USE IN HEATING, VENTILATION, AIR CONDITIONING AND REFRIGERATION SYSTEM FOR MOISTURE LEVEL

CROSS-REFERENCE TO RELATED APPLICATIONS

This application claims the benefit of Provisional Application No. 63/260,877 filed Sep. 3, 2021, the disclosure of which is incorporated herein by reference in its entirety.

BACKGROUND

Exemplary embodiments pertain to the art of optical monitoring. More particularly, the present disclosure relates to configurations of optical monitoring devices for refrigerant systems.

As worldwide regulations aim to reduce greenhouse gas emissions, refrigerant system manufacturers are compelled to use alternative refrigerants, "low pressure refrigerants", i.e. refrigerants that are near, or below atmospheric pressure at the boiling temperatures in a chiller. While low pressure refrigerants have numerous known advantages, they, however, also tend to absorb moisture, which can inhibit chiller performance.

Because the low-pressure chiller system operates at below atmospheric pressure, ambient air can intrude into the chiller and, with it, bring moisture, which is absorbed by the refrigerant, thereby degrading chiller performance and potentially causing other problems. The chiller system is typically monitored for moisture level in the refrigerant, and moisture is periodically dried or purged from the chiller system. Chiller systems can employ a sight glass with a color changing material exposed to the refrigerant stream, with the color indicating a moisture level of the refrigerant. This sight glass indicator requires operators of the HVAC/R system to periodically check the sight glass for indications that the HVAC/R system is operating at reduced system efficiency or capacity (e.g., by circulating wet refrigerant, or insufficient charge, non-condensable gases such as through air ingestion, or the like around the refrigeration cycle). Accordingly, there remains a need for autonomous monitoring system capable of influencing HVAC/R operation when the moisture content of refrigerant in the HVAC/R device exceeds prescribed levels, insufficient refrigerant charge conditions exist, or presence of non-condensable gases is detected.

BRIEF DESCRIPTION

Disclosed is an optical monitoring device comprising: a housing comprising a plurality of walls and an interior space disposed therebetween, an opening disposed in a wall of the plurality of walls, and a movable panel, wherein the opening forms a window through the wall, and wherein the movable panel is configured to be moved to access the interior space; a lamp assembly disposed within the interior space and positioned to project light at the window; a camera comprising an image receiving lens, the camera positioned within the interior space with the image receiving lens is in optical communication with the window; a memory storage device for storing image data; and a controller in electrical communication with the camera and the memory storage device, wherein the controller is configured to compare instant image data from the camera to image data stored on the memory storage device.

In addition to one or more of the above disclosed aspects or as an alternate wherein the lamp assembly comprises one or more light emitting diodes disposed on a lamp circuit board.

In addition to one or more of the above disclosed aspects or as an alternate wherein the camera is disposed on a camera circuit board.

In addition to one or more of the above disclosed aspects or as an alternate wherein the lamp assembly is disposed between the window and the camera.

In addition to one or more of the above disclosed aspects or as an alternate wherein the lamp assembly comprises one or more light emitting diodes disposed on a lamp circuit board having an aperture therethrough, wherein the lamp assembly is disposed between the window and the camera, and wherein the camera is positioned in optical communication with the window through the aperture.

In addition to one or more of the above disclosed aspects or as an alternate wherein the controller comprises a CPU disposed in electrical communication with a main circuit board, the camera, and the memory storage device.

Further disclosed is a HVAC/R system comprising: a compressor, a heat absorbing heat exchanger, and a heat releasing heat exchanger in fluid communication via a piping network fluidly coupling the compressor to the heat absorbing heat exchanger and heat releasing heat exchanger and a moisture sensor disposed in the piping network, wherein the moisture sensor includes a color change material sample exposed to a refrigerant flow through the piping network, the color change material sample configured to change color as an indication of a moisture level of the refrigerant flow, and the optical monitoring device of any one of the above disclosed aspects or as an alternate, wherein the optical monitoring device is coupled to the moisture sensor such that the camera is disposed in optical communication with the color change material sample.

In addition to one or more of the above disclosed aspects or as an alternate further comprising a controller disposed in electrical communication with the camera, wherein the controller is configured to compare image data communicated from the camera to an image data stored in a memory storage device of the controller and change an output signal of the controller in response to a result of the comparison.

In addition to one or more of the above disclosed aspects or as an alternate, wherein the controller comprises a memory storage device and a microprocessor disposed in electrical communication with the memory storage device and the camera; wherein the microprocessor is configured to compare image data communicated from the camera to image data stored in a memory storage device, the microprocessor, and wherein the microprocessor is configured to.

In addition to one or more of the above disclosed aspects or as an alternate wherein the cover is attached to the housing by a threaded interface between the cover and the housing such that the cover and housing can be screwed together or apart.

In addition to one or more of the above disclosed aspects or as an alternate wherein the housing further comprising external mount-positioning features disposed along an exterior of the housing, wherein the external mount-positioning features are configured for aligning the window of the optical monitoring device with the color change material sample of the moisture sensor.

In addition to one or more of the above disclosed aspects or as an alternate wherein the lamp assembly comprises one or more light emitting diodes disposed on a lamp circuit board having an aperture therethrough, and wherein the image receiving lens of the camera is disposed in optical communication through the aperture with the color change material sample.

In addition to one or more of the above disclosed aspects or as an alternate wherein the housing further comprises ribs disposed along one or more interior walls of the housing, and wherein the ribs are configured to support the camera, the lamp assembly, the second circuit board, the third circuit board, or a combination comprising at least one of the foregoing.

In addition to one or more of the above disclosed aspects or as an alternate, where the controller is configured to identify gas bubbles in the view of the camera.

Further disclosed is a method of observing the status of an optical target comprising mounting an optical monitoring device to a gauge having a viewable face; powering the optical monitoring device; illuminating a window of the optical monitoring device by activating a lamp assembly disposed therein; comparing with a controller instant image data output from a camera disposed within the optical monitoring device to predetermined image data stored on a memory storage device; and indicating the status of the gauge based on the result of the instant image data comparison.

In addition to one or more of the above disclosed aspects or as an alternate wherein the gauge comprises a moisture sensor having a color change material sample disposed therein, and wherein the comparing instant image data comprises determining a difference between a numeric color value of one or more pixels of a field of view of the camera and a predetermined numeric color value corresponding to a first condition of the color change material sample.

In addition to one or more of the above disclosed aspects or as an alternate wherein the first condition of the color change material sample corresponds to a wet condition of a moisture sensor.

In addition to one or more of the above disclosed aspects or as an alternate further comprising periodically recording to the memory storage device the image data output from the camera.

In addition to one or more of the above disclosed aspects or as an alternate further comprising waiting to process image data output from the camera for a first time delay after illuminating the lamp assembly.

In addition to one or more of the above disclosed aspects or as an alternate wherein the gauge comprises a sight glass and wherein the method further comprises identifying with the controller a bubble coverage area.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
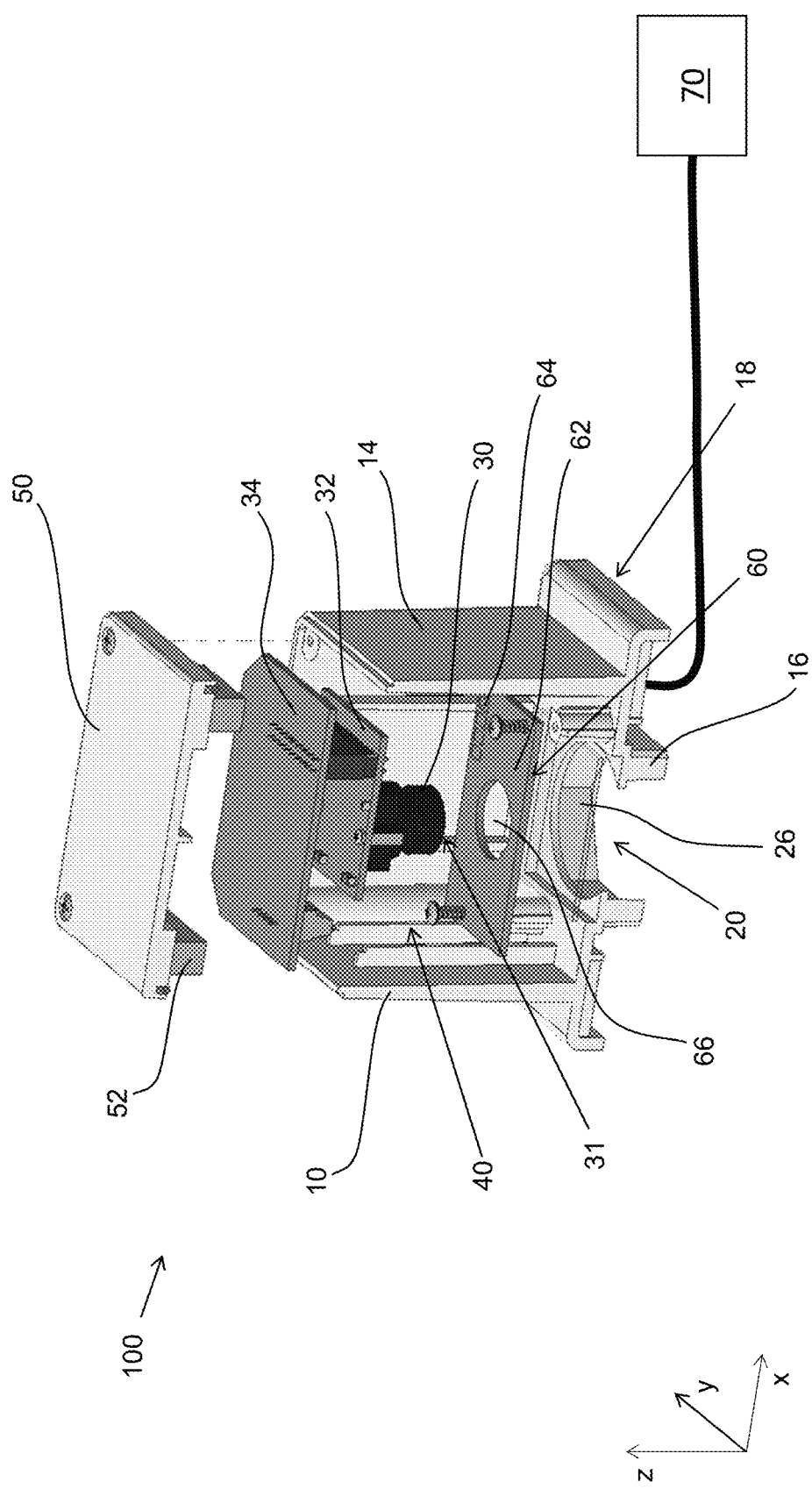
FIG. 1 is a schematic illustration of an exploded cross-sectional view of an optical monitoring device.

FIG. 1 shows a schematic illustration of an exploded cross-sectional view of an optical monitoring device 100. The optical monitoring device 100 includes a camera 30 and a lamp assembly 60 each disposed in an interior space 40 of a housing 10 and arranged to illuminate and view a window 20 through a side of the housing 10. The camera 30 can include any suitable digital camera capable of capturing images. For example, the camera 30 can include a board-level camera, e.g., mounted in electrical communication with, and directly onto, a camera circuit board 32. The camera circuit board 32 can be disposed in electrical communication with a main circuit board 34 (e.g., through pinned connectors, ribbon cables, and the like). Alternatively, the camera circuit board 32 and the main circuit board 34 can be combined into a single board, the camera 30 can be positioned within the interior space 40 of the housing 10 without being directly mounted to a circuit board, or other separable, or combined arrangements are contemplated.

Figure 2:
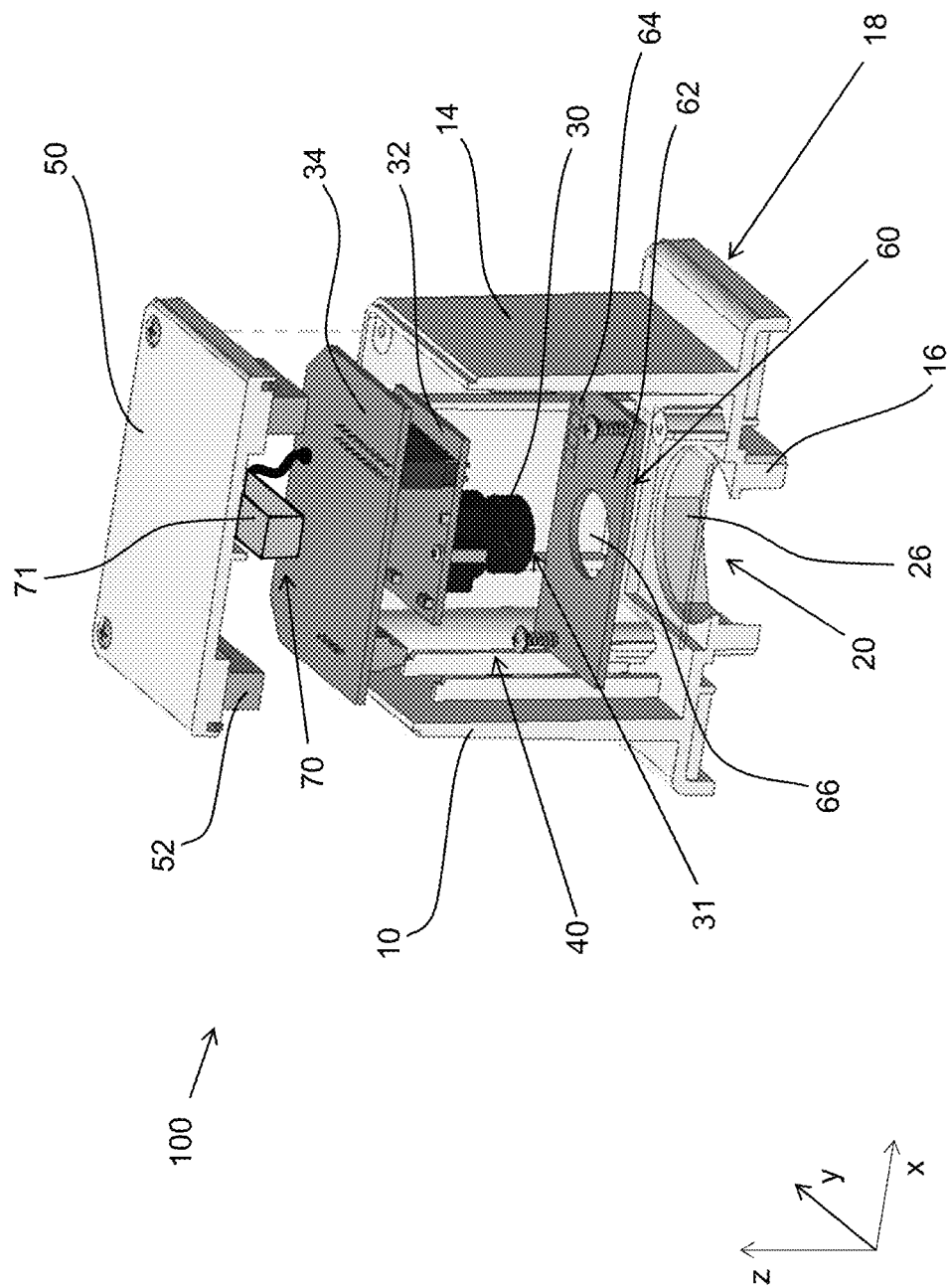
FIG. 2 is a schematic illustration of an exploded cross-sectional view of an optical monitoring device with an internal power supply.

A power supply 70 can provide power to components of the optical monitoring device 100, such as for powering the lamp assembly 60 (e.g., by energizing power supply terminals 64), powering a controller 35, powering the camera 30, and the like. The power supply 70 can include any suitable power source, such as the local power grid, site power supply, or a self-contained power storage device. Optionally, in a wireless application of the optical monitoring device 100, the power supply 70 can include a power storage device 71 which can be configured in the interior space 40 of the housing 10 e.g., as shown in FIG. 2. For example, the optical monitoring device 100 can include a power supply 70 including a power storage device 71 having a battery, capacitor (e.g., super cap), or the like for storing energy used to operate the optical monitoring device 100.

The lamp assembly 60 can include one or more light sources which can be configured to illuminate the window 20. The one or more light sources can be disposed in operable communication with the power supply 70, the controller 35, the camera 30, or a combination including at least one of the foregoing. For example, the one or more light sources can be disposed on a lamp circuit board 62 in electrical communication with power supply terminals 64 which in turn can be disposed in electrical communication with power supply 70. The controller 35, camera 30, power supply 70, or a combination including at least one of the following can be configured to control the illumination of the one or more light sources. For example, the controller 35 can allow power to flow from the power supply 70 to the one or more lights sources when the camera 30 is being used to capture image data (e.g., such as by powering a relay or the like). Accordingly, the controller 35 can be configured to orchestrate the illumination timing of the window 20 to correlate with times the camera 30 is collecting image data As referred to herein a light source can include any suitable light source, such as, e.g., light emitting diodes (LED), organic LED's, polymer LED's, and other electroluminescence sources. The lamp circuit board 62 can include an aperture 66 to allow for a line-of-sight through the board. For example, the aperture 66 can allow an image receiving lens 31 of the camera 30 to view the window 20 through the lamp circuit board 62. Furthermore, the aperture 66 can allow a portion of the camera 30 (e.g., the image receiving lens 31) to extend into or through the plane of the lamp circuit board 62 (e.g., the x-y plane in the attached figures).

The one or more light sources can be arranged on the lamp circuit board 62 in any suitable arrangement. For example, the arrangement and number of light sources can include a pattern of two light sources arranged in a line, a pattern of three light sources arranged in a triangle, a pattern of any number of light sources arranged in a polygon (e.g., where the number of light sources in the pattern is equal to or greater than the number of vertices of the polygon, such as four light sources arranged in a quadrilateral, five light sources arranged in a pentagon, six light sources arranged in a hexagon, five light sources arranged in a quadrilateral, six light sources arranged in a pentagon, seven light sources arranged in a hexagon, and the like), a pattern of any number of light sources arranged in any pattern over at least a portion of the lamp circuit board 62 (e.g., evenly distributed, randomly distributed, distributed along parallel lines, intersecting lines, curved lines, and the like). The one or more light sources can include between 1 and 20 lights, or between 1 and 10 lights or between 1 and 5 lights or between 1 and 4 lights, or 1 light, or 2 lights, or 3 lights, or 4 lights. The one or more lights can be spaced circumferentially around the aperture 66. The one or more lights can be angled or positioned with reflective elements to project light towards the widow 20. When the optical monitoring device 100 includes more than one light source, they can be disposed on the same side of the lamp circuit board 62.

Figure 3:
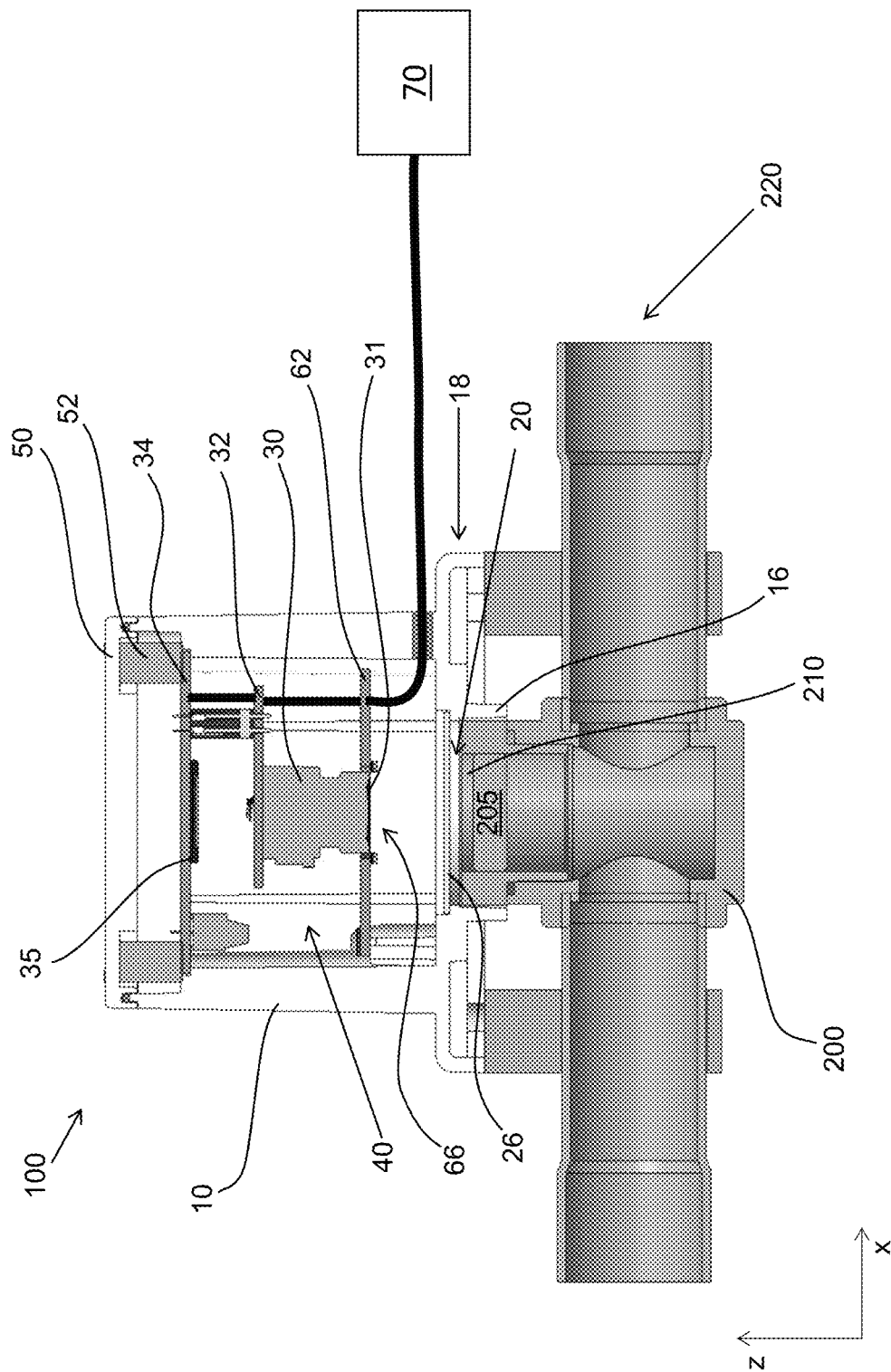
FIG. 3 is a schematic illustration of a cross sectional view of an optical monitoring device installed onto a gauge in a piping system.
Figure 4:
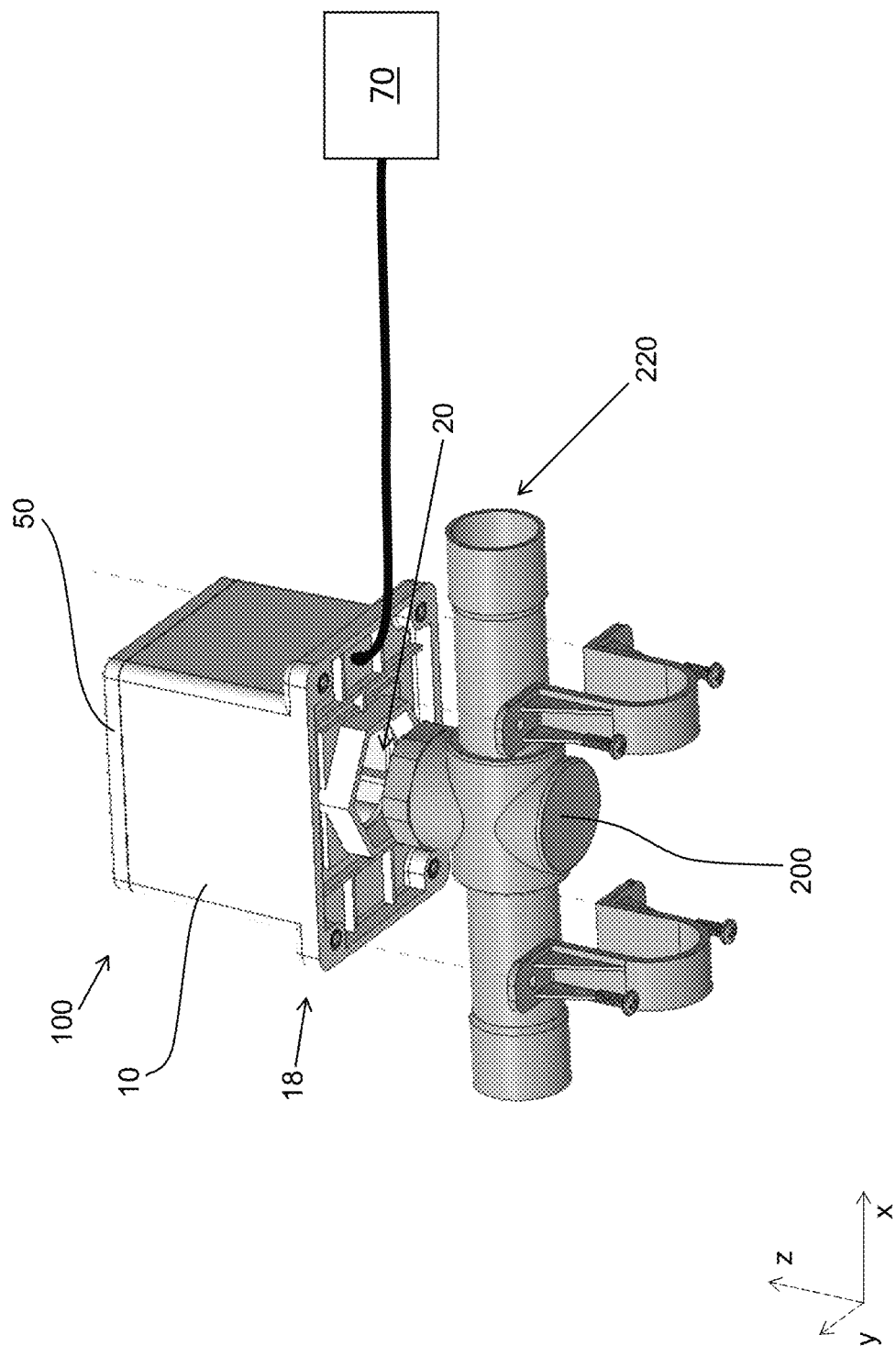
FIG. 4 is a schematic illustration an optical monitoring device for attachment to a gauge of a piping network.

FIGS. 3-4 are schematic illustrations of the optical monitoring device 100. FIG. 3 shows a cross-sectional view of the optical monitoring device 100 installed onto a gauge 200 in a piping system 220. FIG. 4 shows the optical monitoring device 100 ready for attachment to gauge 200 of piping system 220. The window 20 through the housing 10 can be configured to align with the aperture 66 of the lamp circuit board 62 and the image receiving lens 31 of the camera 30 such that the camera 30 can view the window 20. Optionally, an optically transmissive material 26, e.g., glass, clear plastic sheet, or the like, can be placed in the window 20 which can help to prevent ingress of debris, moisture, insects, or the like into the housing 10 while still permitting optical transmission of an optical target 205 through the window 20. Such transmissive material 26 can be secured to the housing 10 using any suitable fastening means, e.g., screws, adhesive, snap fitting to housing, ultrasonic welding, and the like.

In some scenarios, for example, when the saturation temperature of air within the housing 10 is greater than the temperature of the optically transmissive material 26 (e.g., from cold refrigerant flowing through the piping system 220 cooling it), water condensation can occur on the surface of the optically transmissive material 26 (e.g. interior surface within the housing 10, or exterior surface external to the housing 10). When water condenses on the optically transmissive material 26 it can obscure the view of the camera 30. To mitigate this scenario, an anti-fog film or coating can be placed on the interior and/or exterior surface of the optically transmissive material 26 to limit the occurrence of condensation obstructing the view of the camera 30. The anti-fog film or coating can be optically transmissive so as to permit optical transmission of the optical target 205 through the window 20.

The housing 10 can include external mount-positioning features 16 to aid in aligning the camera 30 with an optical target 205 outside the window 20. The external mount-positioning features 16 can be disposed adjacent the window 20. For example, external mount-positioning features 16 can include recesses, protrusions, or other engagements, adjacent to, or abutting the perimeter of the window 20. For example, the external mount-positioning features 16 can include protrusions from the housing 10 that extend at least partially, along the perimeter of the opening 20.

The window 20 and the external mount-positioning features 16 can be shaped to correspond to the shape of an optical target 205 to which the optical monitoring device 100 is attached. The window 20 and the external mount-positioning features 16 can have a non-circular cross-section (e.g., triangular, square, hexagonal, heptagonal, octagonal, or the like) in a plane parallel to the plane of the wall 14 from which the mount-positioning features 16 extend such that when the optical monitoring device 100 is mounted to a gauge 200 at least a portion of the external mount-positioning feature 16 engages a side of the gauge 200 and prevents it from unintended rotation. Furthermore, the external mount-positioning features 16 can include additional engaging surfaces (e.g., side protrusions and/or recesses) for positioning the housing 10 onto a device having an optical target 205, such as onto the gauge 200.

The housing 10 of the optical monitoring device 100 can further include one or more fastening engagement portions 18 to enable securement of the optical monitoring device 100 to the device having an optical target 205. For example, the fastening engagement portions 18 can be coextensive with a wall 14 of the housing 10 or can include one or more flanges extending from the housing 10. The fastening engagement portions 18 can be configured to receive and/or engage a mechanical fastener, e.g., screw, bolt, strap, buckle, clasp, clamp, hook, pin, snap, retainer, circlip or the like, for securing the optical monitoring device 100 to the device having the optical target 205. For example, an optical target 205 can include an in-line gauge, such as where the gauge is disposed between sections of pipe (e.g., sight glass, viewing port), and the fastening engagement portions 18 can be configured to receive bolts or screws for securing the optical monitoring device 100 to the gauge (e.g., with U-brackets fitted around the sections of pipe.

The main circuit board 34 can include a controller 35. The controller 35 can include a central processing unit (CPU) or similar controller (e.g., programmable gate array (FPGA), application specific integrated circuits (ASIC)) for processing image data output from the camera 30. The controller 35 can be disposed on a circuit board. For example, the controller 35 can be disposed on the main circuit board 34. The optical monitoring device 100 can further include a memory storage device (e.g., non-volatile memory) disposed in electrical communication with the controller 35. The main circuit board 34 can include a power supply circuit for powering components of the optical monitoring device 100 (e.g., camera 30, lamp assembly 60, CPU, memory storage device, and the like).

The camera circuit board 32 can include an image data output circuit for transferring image data output from the camera 30 to the main circuit board 34, the controller 35, the memory storage device, and the like. Optionally, the data output circuit can be electrically isolated and/or electrically shielded from the power supply circuit to reduce electromagnetic interference.

The memory storage device can store image data for comparison with image data output from the camera 30. For example, the memory storage device can store one or more multi-dimensional maps for comparison to instant image data output from the camera 30 (e.g., in near real-time, allowing for latency of image digitization, controller processing, data transmission, and the like). The one or more multi-dimensional maps can include a pixel map having pixel location along a two-dimensional grid and pixel color hue information for one or more pixel of the grid (e.g., a bitmap, raster image data, and the like). The pixel color hue information for a pixel can be determined by an additive color model (e.g. red, green, blue color model) such as a model derived from Grassmann's law and can be output from the camera 30. For example, pixel color hue information output in image data from the camera 30 can include numerical values for the red content, green content, and blue content contributing to the color hue of a particular pixel. The pixel color hue information output from the camera 30 can include a numerical value corresponding to the overall color of a pixel based on a combination (e.g., including non-linear combinations, weighted combinations, and the like) of the component color values (e.g., numerical red content value, numerical blue content value, numerical green content value).

The controller 35 can be configured to receive data output from the camera 30 and to compare such instant image data to data stored in the memory storage device. Such comparison can include analyzing a present image for deviation from a known image based on the image data output from the camera 30 and can, for example, be used to determine the state of the optical target 205. The image comparison can include a macroscopic comparison of the entire field of view of the camera 30 to stored data (e.g., image data, color data, position data, temporal data, or combinations including at least one of the foregoing, and the like). The image comparison can include comparing one or more target portions of the field of view of the camera 30 to stored image data.

The camera 30 and/or controller 35 can be configured to disregard portions of the optical target 205 where the color hue values satisfy a disregard threshold condition. For example, the camera 30 and/or the controller 35 can be configured to disregard or ignore (e.g., eliminate from consideration in image comparisons, black out, grey out, white out, or the like) pixels of the camera's field of view when the color hue value of the pixels is less than or equal to a low color hue threshold value, when the color hue value of the pixels is greater than or equal to a high color hue threshold value, or when the color hue value of the pixels is within a selected range of values. This approach can truncate field of view analysis to only portions of the camera's field of view that affect the analysis (e.g., the color changing material and not the collar of the gauge 200).

Target portions of the camera's field of view can be predetermined and set in the firmware of the camera 30 and/or controller 35. Alternatively, target portions of the camera's field of view used for comparison to stored data can be determined by the controller 35 through a method of analyzing the instant field of view of camera 30 for an optical sign and then locating the target portions based on their location relative to the optical sign. In this way, the optical monitoring device 100 can self-learn the orientation of the optical target 205 upon installation and autonomously calibrate the controller 35 for processing image data output from the camera 30 according to the installed orientation. Such autonomous calibration can include applying a translational function, a rotational function, or a combination thereof to pixel locations associated with the instant image data output from the camera 30 or with image data stored in the memory storage device to align the pixel grids of the two data sources based on the location of the optical sign. For example, an optical target 205 can include one or more optical signs affixed to standardized position(s) on the optical target 205, e.g., to indicate the orientation of the optical target 205. An optical sign can include text, graphic designs, shapes, images, and the like. An optical sign can be configured to contrast from the surrounding background. In an example, an optical sign can include a trademark printed on the face, or on a collar around the face, of a color indicating gauge 200 to which the optical monitoring device 100 is attached. In another example, the optical sign can include a color changing material disposed within a sight glass for monitoring the moisture content of refrigerant flowing therethrough. The color changing material can have a predetermined shape (e.g., ring shaped, square, circular, or the like) which can be recorded in the memory storage device and can be used to focus image analysis on the relevant portion of the field of view of the camera to interpret the status of the gauge 200.

Once the orientation of the optical target 205 is determined, the controller 35 can scan the instant image data output from the camera 30, translate and/or rotate pixel locations based on the location of the optical sign (e.g., to the extent needed to align or superimpose the instant image and the predetermined image), and compare the color hue value of one or more pixels, pixel rows, pixel columns, set of adjacent pixels, or another grouping of pixels in the field of view of the camera 30, to a predetermined color hue value for the one or more pixels, pixel rows, pixel columns, set of adjacent pixels, or other grouping of pixels stored in memory. Based on the magnitude of deviation from the predetermined color hue value(s) the controller 35 can determine the location of the optical sign. For example, the controller 35 can be configured to identify the location of the optical sign by locating a grouping of pixels in the instant image data output from the camera 30 that matches a predetermined grouping of pixels stored in memory (e.g., has an insignificant deviation, or lowest deviation in comparison to all other pixels in the image data).

Image data stored in the memory storage device can include a pixel color hue value (e.g., component color values such as red value, green value, and blue value, and/or a combination thereof, including non-linear combinations thereof, weighted combinations thereof, or the like) and pixel location (e.g., position on a two-dimensional pixel map, such as corresponding to map of the field of view of the camera 30). The image data values stored in the memory storage device can include threshold values used for comparison to image data output from the camera 30. For example, threshold values can include one or more individual component color thresholds such as red-component value threshold, blue-component value threshold, and/or green-component value threshold, or an overall pixel color hue value threshold (e.g., including a combination of the red, blue, and green component color values). The controller 35 can be configured to compare pixel map information in the image data output from the camera 30 to the threshold values of the pixel map information stored in the memory storage device to determine the status of the optical target 205. The comparison can include any suitable mathematical comparison to determine closeness, or deviation from, a known image. For example, the comparison can include subtracting the red, green, and/or blue values, or some combination thereof, for each pixel in the image data output from the camera 30 from a known pixel map data set (e.g., stored in the memory storage device). Based on the extent of deviation from the known pixel map the controller 35 can be configured to report status of the optical target 205 to an external device (e.g., to a controller associated with an heating, ventilation, air condition, or refrigeration system (HVAC/R system), or other refrigerant containing device).

The optical monitoring device 100 can be disposed in optical communication with an optical target 205. The optical target 205 can include an indicator of a gauge 200 for indicating the status of a parameter measured by the gauge 200 (e.g., a needle, a numeric indicator, a color changing indicator, and the like), conditions of a fluid flowing across a sight glass (e.g. presence, size, and area of coverage of bubbles within the fluid), the condition of a color change material sample disposed within a fluid flow visible through a sight glass, combinations including at least one of the foregoing, or the like. As used herein a gauge 200 can refer to any measuring device having a visual display for indicating a value, status, or condition of the parameter. For example, a gauge 200 can include a pressure sensor, a temperature sensor, a moisture sensor, a tachometer, a speedometer, an acoustics monitoring device, a sight glass, and the like.

In HVAC/R systems, such as chillers, a moisture sensor can be used to provide a visual indication of the level of water that is contained in the refrigerant within the system. The moisture sensor can include a sensor housing having a fluid inlet and fluid outlet and a color change material sample disposed therein such that fluid flowing through the sensor can interact with the color changing material sample. The moisture sensor can be installed in a piping section 220 of the HVAC/R system in a gauge 200 having a sight glass 210 for allowing visual display of the color change material sample for viewing by an operator of the optical monitoring device 100. In chiller installations, such as in machine rooms of a building, the sight glass can occasionally be monitored by operators of the chiller, but this monitoring function is infrequent and building managers seeking to minimize building expenses will often forgo such periodic maintenance tasks. Accordingly, the optical monitoring device 100 can be installed onto the sight glass 210 of the moisture sensing gauge 200 and can be configured to monitor the condition of the color changing material and the fluid flowing through the site glass.

The color change material sample can be configured to change color in the presence of water. For example, the color change material sample can include a chemical salt that changes color according to the moisture concentration of the fluid interacting with the sample. The chemical salt can be configured to change various colors depending on the salt. Some moisture sensors can turn from a dark blue at low moisture levels (e.g., up to about 55 parts per million by volume (ppmv)) to a purple at higher moisture levels (e.g., greater than or equal to about 120 ppmv), while others can change from green at low moisture levels to yellow at higher moisture levels. For example, the color change material sample can exhibit a green color hue when the refrigerant flow is "dry", (e.g., water concentration of less than 55 ppmv). The color change material sample can turn a chartreuse when the refrigerant flow has a moisture level of between about 50-55 ppmv up to about 120-150 ppmv. When an intermediate level of moisture is detected a caution can be indicated by the controller 35 to alert operators to the moisture condition (e.g., by illumination of a signal, issuance of an alarm, such as an light, sound, or message, indicating a warning, or relaying the status to a controller of the HVAC/R system for appropriate control action to be taken). The color change material sample can turn a yellow color when the refrigerant flow has a moisture level of greater than 120-150 ppmv. Under these conditions, the controller 35 can be configured to indicate a heightened warning (e.g., by initiating illumination of a signal or issuance of an alarm, such as a red light, sound or message, indicating a higher warning level, or relaying the status to a controller of the HVAC/R system for appropriate control action to be taken). These ranges are merely exemplary, the exact concentration levels at which a moisture sensor changes color is specific to moisture sensor manufacturer and the chemical salts used in the color changing material samples. These concentration values can further depend on the type of refrigerant and the temperature of the refrigerant.

In addition to monitoring the condition of the color change material sample disposed in the refrigerant flow, a gauge 200 having a sight glass can allow for the monitoring of the conditions of the fluid flowing through the gauge, such as the existence/presence of gas bubbles (e.g., indicating low refrigerant charge conditions within the HVAC/R system). Accordingly, the optical monitoring device 100 can be configured to recognize the presence and extent of bubbles (e.g., area of bubble coverage over time, area of bubble coverage relative to the area of refrigerant coverage on the face of gauge 200 over time, or the like) in the refrigerant flow and alert the HVAC/R controller to such conditions should they warrant corrective action. For example, the camera 30, the controller 35, the memory storage device or a combination including at least one of the foregoing can be configured to scan instant image data from the camera 30 for the presence of bubbles, estimate a bubble coverage area which reflects the total area covered by bubbles and compare the estimated bubble coverage area to a bubble coverage area threshold value. Further, said comparison can be performed instantly (e.g., as a snapshot) or over a designated time-span, e.g., allowing for time-averaging the bubble coverage area. If the estimated coverage area exceeds the bubble coverage area threshold value, then the controller 35 can be configured to communicate such status to the HVAC/R controller for further corrective action. One method of estimating the bubble area is through the use of image recognition software, or computer vision, which can identify circularly patterned variations in color hue information in the image data from the camera 30 to estimate bubble location/presence, and/or size (e.g. area occupied in the field of view of the camera 30).

The HVAC/R controller may also be configured to take action to reduce the moisture level of the refrigerant flow when the optical monitoring device 100 indicates that the moisture level exceeds a selected threshold. For example, the HVAC/R controller can activate a purge system and direct refrigerant flow into the purge system by operation of purge valve to reduce the moisture level of the refrigerant flow. The HVAC/R controller can be configured to take a corrective control action if the moisture level exceeds a moisture concentration threshold. Such a threshold may be set based on the type of refrigerant and may be adjusted based on a measured temperature of the refrigerant in the HVAC/R system. In an example, the moisture concentration threshold can be 150 ppmv, or 120 ppmv.

The HVAC/R controller may also be configured to take action to mitigate low refrigerant charge when the optical monitoring device 100 indicates that the bubble coverage area exceeds the bubble coverage area threshold value. For example, the HVAC/R controller can be configured to reduce the thermal output of the HVAC/R system (e.g., reduce the refrigerant flow rate) until the bubble coverage area decreases to an acceptable level. The HVAC/R controller can be configured to take a corrective control action if the bubble coverage area exceeds the bubble coverage area threshold value. Such a threshold may be set based on the type of refrigerant and may be adjusted based on a measured temperature of the refrigerant in the HVAC/R system. In an example, the bubble coverage area threshold can be greater than or equal to about 5 square millimeters ($mm^2$), or about 10 $mm^2$, or about 15 $mm^2$, or about 20 $mm^2$, or about 25 $mm^2$, or about 30 $mm^2$, or about 35 $mm^2$, or about 40 $mm^2$, or about 45 $mm^2$, or about 50 $mm^2$. Alternatively, a ratio of the bubble coverage area to the total refrigerant flow area visible on the face of the gauge 200 can be used in place of the bubble coverage area. When such a ratio is used a corresponding bubble coverage area ratio threshold can be used to trigger corrective actions by the HVAC/R controller. For example, a bubble coverage area ratio threshold can be greater than or equal to about 5%, or about 10%, or about 15% or about 20%, or about 25% or about 30% or about 35%, or about 40%, or about 45%, or about 50%, or about 75%, or about 90%. Predetermined image data stored on a memory storage device can further include one or more numerical values representing the bubble coverage area threshold, the bubble coverage area ratio threshold percentage, or both.

The optical monitoring device 100 disclosed herein enables automatic diagnosis of the moisture level of the refrigerant in an HVAC/R system without the need for operator intervention. The optical monitoring device 100 can communicate directly with the HVAC/R controller to initiate warnings and/or other actions and can operate at low cost. Further, there is not direct contact of electrically energized components with the refrigerant.

The optical monitoring device 100 can be configured to communicate with an external device to inform the external device of the status of the gauge 200 to which the optical monitoring device 100 is mounted. For example, the optical monitoring device 100 can include a data transmitter (e.g., wireless) disposed in electrical communication with the controller 35 (e.g., on circuit board 34, or external thereto). The data transmitter can transmit image data originating from the camera 30 to the external device (e.g., via a wireless network such as Bluetooth, Bluetooth low energy, Wi-Fi, ZigBee, Z-wave, or the like). The external device can analyze the image data output from the camera 30, comparing it to predetermined images, and take a control action in response to evaluation of the determined status of the gauge 200. The external device can analyze the image data output from the camera 30 in the same way as previously described or can employ a more computationally intensive methods, such as a machine learning method.

The housing 10 includes a plurality of walls 14 surrounding the interior space 40, a movable panel 50, and an opening forming a window 20 through a side of the housing 10. The housing 10 can be any shape. For example, the housing 10 can be cylindrical, box-like, conical, pyramidal, and the like. The housing 10 can be formed from any suitable material. For example, the housing 10 can include a metal (e.g., aluminum, iron, alloys thereof, and the like), a plastic (e.g., polyethylene, polyethylene terephthalate (PET), polyvinylchloride (PVC), polyoxymethylene (POM), polycarbonate, polytetrafluoroethylene (PTFE), acrylonitrile butadiene styrene (ABS), and the like), or a combination including at least one of the foregoing.

The housing 10 includes a movable panel 50. The movable panel 50 can form a substantial portion of a wall 14 of the housing 10. For example, the movable panel 50 can form an end wall of the housing 10. The movable panel 50 can be separable from the housing 10, such as a separate removable piece. The movable panel 50 can remain attached to the housing 10 (e.g., with a leash, a hinge, a clip, a slot, or the like) when disengaged from its installed position (e.g., not covering access to the interior space). The movable panel 50 can be attached to the housing 10 in any suitable fashion. For example, screws can attach the movable panel 50 to the housing 10. In another example, the housing 10 can be cylindrical, or can include a cylindrical section, having threads for engaging the movable panel 50, such that the moveable portion 50 and the housing 10 can be screwed together. In another example, the movable panel 50 can be movably attached to the housing 10 to form a portion of a wall 14 of the housing 10. For example, the moveable portion 50 can be attached to the housing 10 via a hinge and configured to pivot open to allow access to the interior space 40. The housing 10 and/or movable panel 50 can include corresponding attachment features for securing the movable panel 50 to the housing 10 to prevent access to the interior space 40.

The optical monitoring device 100 can be configured for a method of observing the status of an optical target 205. The method can include a first aspect of mounting the optical monitoring device 100 to a gauge 200. The method can include a second aspect of providing power to the optical monitoring device 100. The method can include a third aspect of illuminating the window 20 of the optical monitoring device 100 by powering the lamp assembly 60 of the optical monitoring device 100. The method can include a fourth aspect of adjusting the power to the lamp assembly 60 until the window 20 is sufficiently illuminated (e.g., as determined by monitoring the color of a fixed aspect of the optical monitoring device 100, such as a portion of the interior of the housing 10 or a reference image disposed on the optical monitoring device 100 and within the field of view of the camera 30). The method can include waiting until illumination of the window 20 is confirmed before recording, analyzing, transmitting, or processing image data output from the camera 30. The method can include a fifth aspect of transmitting instant image data output from the camera 30 to the controller 35, an external device or the like. The method can include a sixth aspect of comparing the instant image data output from the camera 30 to data stored on the memory storage device. The data stored on the memory storage device can include image data, the bubble coverage area threshold value, the bubble coverage area ratio threshold value, data representing the optical sign, or a combination including at least one of the foregoing, or the like. The comparing can include any suitable comparison method, such as addition, subtraction, multiplication, or division of numerical representations of color hue information from the image data. The method can include a seventh aspect of indicating a status of the gauge 200 based on the result of the image data comparison. The method can include an eight aspect of recording image data output from the camera 30 to the memory storage. The method can include a ninth aspect of periodically recording the image data output from the camera 30 to the memory storage device t.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A HVAC/R system comprising:
   a compressor, a heat absorbing heat exchanger, and a heat releasing heat exchanger in fluid communication via a piping network fluidly coupling the compressor to the heat absorbing heat exchanger and heat releasing heat exchanger and
   a moisture sensor disposed in the piping network, wherein the moisture sensor includes a color change material sample exposed to a refrigerant flow through the piping network, the color change material sample configured to change color as an indication of a moisture level of the refrigerant flow, and
   an optical monitoring device comprising:
   a housing comprising a plurality of walls and an interior space disposed therebetween, an opening disposed in a wall of the plurality of walls, and a movable panel, wherein the opening forms a window through the wall, and wherein the movable panel is configured to be moved to access the interior space;
   a lamp assembly disposed within the interior space and positioned to project light at the window;
   a camera comprising an image receiving lens, the camera positioned within the interior space with the image receiving lens is in optical communication with the window;
   a memory storage device for storing image data; and
   a controller in electrical communication with the camera and the memory storage device, wherein the controller is configured to compare instant image data from the camera to image data stored on the memory storage device;
   wherein the optical monitoring device is coupled to the moisture sensor such that the camera is disposed in optical communication with the color change material sample.

2. The HVAC/R system of claim 1, wherein the lamp assembly comprises one or more light emitting diodes disposed on a lamp circuit board.

3. The HVAC/R system of claim 1, wherein the camera is disposed on a camera circuit board.

4. The HVAC/R system of claim 1, wherein the lamp assembly is disposed between the window and the camera.

5. The HVAC/R system of claim 1, wherein the lamp assembly comprises one or more light emitting diodes disposed on a lamp circuit board having an aperture therethrough, wherein the lamp assembly is disposed between the window and the camera, and wherein the camera is positioned in optical communication with the window through the aperture.

6. The HVAC/R system of claim 1, wherein the controller comprises a central processing unit disposed in electrical communication with a main circuit board, the camera, and the memory storage device.

7. The HVAC/R system of claim 1, further comprising a controller disposed in electrical communication with the camera, wherein the controller is configured to compare image data communicated from the camera to an image data stored in a memory storage device of the controller and change an output signal of the controller in response to a result of the comparison.

8. The HVAC/R system of claim 1, wherein the controller comprises a memory storage device and a microprocessor disposed in electrical communication with the memory storage device and the camera; wherein the microprocessor is configured to compare image data communicated from the camera to image data stored in a memory storage device, the microprocessor, and wherein the microprocessor is configured to.

9. The HVAC/R system of claim 1, wherein a cover is attached to the housing by a threaded interface between the cover and the housing such that the cover and housing can be screwed together or apart.

10. The HVAC/R system of claim 1, wherein the housing further comprising external mount-positioning features disposed along an exterior of the housing, wherein the external mount-positioning features are configured for aligning the window of the optical monitoring device with the color change material sample of the moisture sensor.

11. The HVAC/R system of claim 1, wherein the lamp assembly comprises one or more light emitting diodes disposed on a lamp circuit board having an aperture therethrough, and wherein the image receiving lens of the camera is disposed in optical communication through the aperture with the color change material sample.

12. The HVAC/R system of claim 1, wherein the housing further comprises ribs disposed along one or more interior walls of the housing, and wherein the ribs are configured to support the camera, the lamp assembly, the second circuit board, the third circuit board, or a combination comprising at least one of the foregoing.

13. The HVAC/R system of claim 1, where the controller is configured to identify gas bubbles in the view of the camera.

14. A method of observing the status of an optical target comprising:
   mounting an optical monitoring device to a gauge having a viewable face;
   powering the optical monitoring device;
   illuminating a window of the optical monitoring device by activating a lamp assembly disposed therein;
   comparing with a controller instant image data output from a camera disposed within the optical monitoring device to predetermined image data stored on a memory storage device; and indicating the status of the gauge based on the result of the instant image data comparison.

15. The method of claim 14, wherein the gauge comprises a moisture sensor having a color change material sample disposed therein, and wherein the comparing instant image data comprises determining a difference between a numeric color value of one or more pixels of a field of view of the camera and a predetermined numeric color value corresponding to a first condition of the color change material sample.

16. The method of claim 15, wherein the first condition of the color change material sample corresponds to a wet condition of a moisture sensor.

17. The method of claim 14, further comprising periodically recording to the memory storage device the image data output from the camera.

18. The method of claim 14, further comprising waiting to process image data output from the camera for a first time delay after illuminating the lamp assembly.

19. The method of claim 14, wherein the gauge comprises a sight glass and wherein the method further comprises identifying with the controller a bubble coverage area.

* * * * *